United States Patent
Santra et al.

(10) Patent No.: US 7,833,344 B2
(45) Date of Patent: Nov. 16, 2010

(54) ULTRA LOW DENSITY CEMENT COMPOSITIONS AND METHODS OF MAKING SAME

(75) Inventors: Ashok K. Santra, Duncan, OK (US); Christopher L. Gordon, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 937 days.

(21) Appl. No.: 11/592,933

(22) Filed: Nov. 3, 2006

(65) Prior Publication Data

US 2008/0105167 A1    May 8, 2008

(51) Int. Cl.
*C04B 9/00*    (2006.01)
(52) U.S. Cl. ............... 106/685; 106/686; 106/688; 106/690; 106/801; 106/802
(58) Field of Classification Search ............ 106/690, 106/685, 686, 688, 801, 802
See application file for complete search history.

(56) References Cited

U.S. PATENT DOCUMENTS

| | | | | |
|---|---|---|---|---|
| 3,138,472 A | * | 6/1964 | Sommer | 106/671 |
| 3,147,128 A | * | 9/1964 | Harrell | 106/646 |
| 3,573,941 A | * | 4/1971 | Edwards et al. | 106/677 |
| 3,816,148 A | | 6/1974 | Barthel | |
| 4,059,455 A | * | 11/1977 | Limes et al. | 106/690 |
| 4,234,344 A | | 11/1980 | Tinsley et al. | 106/88 |
| 4,304,298 A | | 12/1981 | Sutton | 166/293 |
| 4,340,427 A | | 7/1982 | Sutton | 106/87 |
| 4,367,093 A | | 1/1983 | Burkhalter et al. | 106/87 |
| 4,450,010 A | | 5/1984 | Burkhalter et al. | 106/87 |
| 4,565,578 A | | 1/1986 | Sutton et al. | 106/87 |
| 4,756,762 A | * | 7/1988 | Weill et al. | 106/691 |
| 4,786,328 A | * | 11/1988 | Weill et al. | 106/691 |
| 5,213,161 A | | 5/1993 | King et al. | 166/293 |
| 5,220,960 A | | 6/1993 | Totten et al. | 166/293 |
| 5,281,270 A | | 1/1994 | Totten et al. | 106/687 |
| 5,298,069 A | | 3/1994 | King et al. | 106/686 |
| 5,346,012 A | | 9/1994 | Heathman et al. | 166/293 |

(Continued)

FOREIGN PATENT DOCUMENTS

DE    267247 A1    4/1989

(Continued)

OTHER PUBLICATIONS

Foreign Communication from a related counterpart application—International Search Report and Written Opinion, PCT/GB2007/004178, Feb. 13, 2008, 14 pages.

(Continued)

*Primary Examiner*—Paul Marcantoni
(74) *Attorney, Agent, or Firm*—Craig W. Roddy; Conley Rose

(57) ABSTRACT

A slurry composition comprising an alkaline metal oxide, a chloride or phosphate salt, water, glass beads and a foaming agent. A foamed slurry comprising magnesium oxide, water, a chloride or phosphate salt, and glass beads, wherein the slurry has a density of from about 4 to about 12 pounds per gallon. A foamed slurry comprising magnesium oxide, water, a chloride or phosphate salt, and beads, wherein the slurry has a density of from about 4 to about 12 pounds per gallon and the set slurry is acid soluble.

21 Claims, 1 Drawing Sheet

U.S. PATENT DOCUMENTS

| | | | | |
|---|---|---|---|---|
| 5,484,019 | A | 1/1996 | Griffith | 166/293 |
| 5,571,318 | A | 11/1996 | Griffith et al. | 106/725 |
| 5,588,488 | A | 12/1996 | Vijn et al. | 166/293 |
| 5,645,637 | A * | 7/1997 | Yaniv | 106/677 |
| 5,766,337 | A * | 6/1998 | Moon | 106/690 |
| 5,913,364 | A | 6/1999 | Sweatman | 166/281 |
| 6,060,535 | A | 5/2000 | Villar et al. | 523/130 |
| 6,063,738 | A | 5/2000 | Chatterji et al. | 507/269 |
| 6,136,088 | A * | 10/2000 | Farrington | 106/691 |
| 6,167,967 | B1 | 1/2001 | Sweatment | 166/281 |
| 6,204,214 | B1 * | 3/2001 | Singh et al. | 501/155 |
| 6,258,757 | B1 | 7/2001 | Sweatman et al. | 507/219 |
| 6,367,550 | B1 | 4/2002 | Chatterji et al. | 166/293 |
| 6,478,868 | B1 | 11/2002 | Reddy et al. | 106/696 |
| 6,547,871 | B2 | 4/2003 | Chatterji et al. | 106/672 |
| 6,562,122 | B2 | 5/2003 | Dao et al. | 106/705 |
| 6,601,647 | B2 | 8/2003 | Brothers et al. | 166/293 |
| 6,631,766 | B2 | 10/2003 | Brothers et al. | 166/293 |
| 6,648,961 | B2 | 11/2003 | Brothers et al. | 106/692 |
| 6,660,078 | B2 | 12/2003 | Brothers et al. | 106/705 |
| 6,664,215 | B1 | 12/2003 | Tomlinson | 507/269 |
| 6,761,218 | B2 | 7/2004 | Nguyen et al. | 166/278 |
| 6,776,237 | B2 | 8/2004 | Dao et al. | 166/292 |
| 6,811,603 | B2 | 11/2004 | Brothers et al. | 106/718 |
| 6,874,578 | B1 | 4/2005 | Garnier et al. | 166/293 |
| 6,883,609 | B2 | 4/2005 | Drochon et al. | 166/292 |
| 6,887,833 | B2 | 5/2005 | Brothers et al. | 507/209 |
| 6,889,767 | B2 | 5/2005 | Reddy et al. | 166/293 |
| 6,964,302 | B2 | 11/2005 | Luke et al. | 166/293 |
| 7,044,222 | B2 | 5/2006 | Tomlinson | 166/292 |
| 7,063,738 | B2 | 6/2006 | Danican et al. | 106/672 |
| 7,073,584 | B2 | 7/2006 | Reddy et al. | 166/293 |
| 7,096,944 | B2 | 8/2006 | Varg, Jr. et al. | 166/250.12 |
| 7,160,383 | B2 * | 1/2007 | Wagh et al. | 106/691 |
| 7,204,880 | B1 * | 4/2007 | Turner et al. | 106/691 |
| 7,438,755 | B2 * | 10/2008 | Wagh et al. | 106/690 |
| 7,491,267 | B2 * | 2/2009 | Francis et al. | 106/690 |
| 7,530,394 | B2 | 5/2009 | Santra et al. | |
| 2004/0003759 | A1 | 1/2004 | Brothers et al. | 106/706 |
| 2004/0168830 | A1 | 9/2004 | Reddy et al. | 175/65 |
| 2005/0076812 | A1 | 4/2005 | Reddy et al. | 106/672 |
| 2005/0166803 | A1 | 8/2005 | Dillenbeck et al. | 106/814 |
| 2005/0252419 | A1 * | 11/2005 | Mabey | 106/638 |
| 2005/0263285 | A1 * | 12/2005 | Santra et al. | 166/294 |
| 2006/0060354 | A1 | 3/2006 | Lewis et al. | 166/293 |
| 2006/0201394 | A1 | 9/2006 | Kulakofsky et al. | 106/676 |
| 2006/0201672 | A1 | 9/2006 | Kulakofsky et al. | 166/250.14 |
| 2007/0017418 | A1 * | 1/2007 | Dennis | 106/685 |
| 2007/0051278 | A1 | 3/2007 | Wagh et al. | |
| 2007/0125276 | A1 * | 6/2007 | Reddy et al. | 106/689 |

FOREIGN PATENT DOCUMENTS

EP    0582367 A1    9/1994

OTHER PUBLICATIONS

Office Action dated Nov. 4, 2009 (17 pages), U.S. Appl. No. 11/592,932, filed Nov. 3, 2006.
Office Action dated Apr. 24, 2009 (11 pages), U.S. Appl. No. 11/592,932, filed Nov. 3, 2006.
Office Action dated Jun. 25, 2008 (19 pages), U.S. Appl. No. 11/592,932, filed Nov. 3, 2006.
Final Office Action dated Dec. 18, 2008, (12 pages), U.S. Appl. No. 11/592,932, filed Nov. 3, 2006.
Office Action (Final) dated Apr. 29, 2010 (16 pages), U.S. Appl. No. 11/592,932, filed Nov. 3, 2006.
Foreign communication from a related counterpart application—European Examination Report for application No. 07 824 417.5, Apr. 26, 2010, 7 pages.
Baroid brochure entitled "BARAZAN® D Viscosifier/Suspension Agent" dated Sep. 5, 2006.
Halliburton brochure entitled "MicorBond HT™ Cement Additive" dated Jul. 2006.
Halliburton brochure entitled "MicroBond M™ Cement Additive" dated Jul. 2006.
Halliburton brochure entitled "Cementing Spherelite Cement Additive" undated but admitted to be prior art.
Hewlett, Peter, "Lea's Chemistry of Cement and Concrete," Fourth Edition, 2003: Elsevier Publishing; pp. 813-820.
Halliburton brochure entitled "Super CBL™ Additive" dated Jul. 2006.
Halliburton brochure entitled "Thermatek$^{SM}$ Service" dated May 2005.
Lewis, Sam et al., "Cementing Additives for use in Environmentally Sensitive Regions".
Kulakofsky, David, "New Liquid Microsphere System Simplifies Lightweight and Ultra-Lightweight Cementing," AADE-06-DF-HO-46.
Santra, Ashok et al. "Methods of Servicing Wellbore With Composition Comprising Ultra Low Density Thermatek Slurries" filed Nov. 3, 2006 as U.S. Appl. No. 11/592,932.

* cited by examiner

ULTRA LOW DENSITY CEMENT COMPOSITIONS AND METHODS OF MAKING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present disclosure generally relates to well cementing, and more particularly to ultra low density cement compositions for use in wellbore servicing.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. The main objectives of primary cementing operations include zonal isolation to prevent migration of fluids in the annulus, support for the casing or liner string, and protection of the casing string from corrosive formation fluids. Subsequent secondary cementing operations may also be performed. Secondary or remedial cementing operations are performed to repair primary-cementing problems or to treat conditions arising after the wellbore has been constructed.

Due to various wellbore conditions, there are often needs for slurries with wide-ranging densities. For example, if the formation has a low fracture gradient, a low density slurry is needed to perform water shutoff and other standard cementing operations without fracturing the formation and causing loss circulation problems. It is also desirable for the slurry to transition from the flowable (slurry) state to the solid state in a predictable and rapid manner to allow placement of the slurry and to minimize invasiveness.

A particular challenge in cementing is the development of compressive strength in a cement slurry with an ultra low density. Thus, a need exists for cement compositions that rapidly develop compressive strength at ultra low densities.

BRIEF SUMMARY OF SOME OF THE PREFERRED EMBODIMENTS

Disclosed herein is a slurry composition comprising an alkaline metal oxide, a chloride or phosphate salt, water, glass beads and a foaming agent.

Also disclosed herein is a foamed slurry comprising magnesium oxide, water, a chloride or phosphate salt, and glass beads, wherein the slurry has a density of from about 4 to about 12 pounds per gallon.

Further disclosed herein is a foamed slurry comprising magnesium oxide, water, a chloride or phosphate salt, and beads, wherein the slurry has a density of from about 4 to about 12 pounds per gallon and the set slurry is acid soluble.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
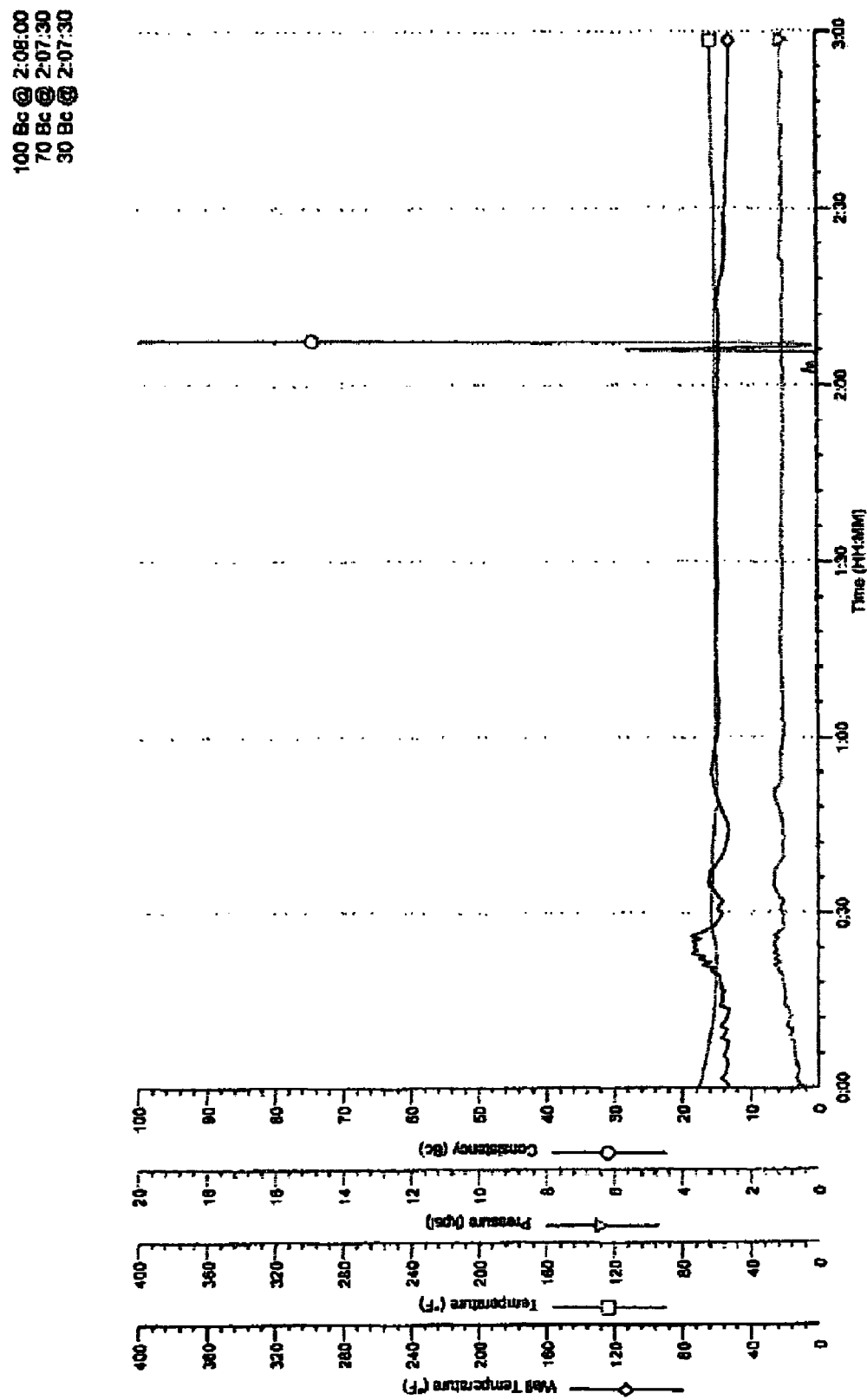
FIG. 1 is a graph of slurry viscosity as a function of time.

Disclosed herein are cement compositions for use in servicing a wellbore. Such compositions may comprise a metal oxide, a chloride or phosphate salt, at least one density reducing agent and water. Alternatively, such compositions may comprise a metal oxide, a chloride or phosphate salt, at least two density reducing agents and water. Said cement compositions may form a hydraulic cement. Herein hydraulic cement refers to a powdered material that develops adhesive qualities and compressive strength when cured with water. Each of the components of the cement will be described in more detail herein below. In an embodiment, the cement compositions disclosed herein may be prepared as ultra low density slurries which rapidly develop a desirable compressive strength. Herein a cement composition having an ultra low density may have a density of less than about 12 ppg, alternatively less than about 7 ppg, alternatively less than about 5 ppg. Such compositions are referred to hereafter as ultra low density cement compositions (ULDCCs).

In an embodiment, a ULDCC comprises a metal oxide, alternatively an alkaline earth metal oxide, alternatively magnesium oxide. In an embodiment, the ULDCC comprises MgO. MgO may be prepared by calcination of $Mg(OH)_2$ as depicted in Reaction 1:

$$Mg(OH)_2 \xrightarrow{heat} MgO + H_2O \quad \text{(Reaction 1)}$$

The calcination of $Mg(OH)_2$ results in what is commonly referred to as "burned" MgO. Three basic grades of burned MgO are typically produced with the differences between each grade related to the degree of reactivity remaining after being exposed to a range of high temperatures. The original magnesium hydroxide particle is usually a large and loosely bonded particle. Exposure to thermal degradation by calcination causes the $Mg(OH)_2$ to alter its structure so that the surface pores are slowly filled in while the particle edges become more rounded. This results in MgO with varying degrees of crystallinity and consequently varying degrees of reactivity. When the MgO is produced by calcining to temperatures ranging between 1500° C.-2000° C. the MgO is referred to as "dead-burned" since the majority of the reactivity has been eliminated. Dead-burned MgO has the highest degree of crystallinity of the three grades of burned MgO. An example of a dead-burned MgO includes without limitation THERMATEK™ HT rigid setting fluid which is commercially available from Halliburton Energy Services. A second type of MgO produced by calcining at temperatures ranging from 1000° C.-1500° C. is termed "hard-burned" and displays an intermediate crystallinity and reactivity when compared to the other two grades of burned MgO. An example of a hard-burned MgO includes without limitation THERMATEK™ HT rigid setting fluid which is commercially available from Halliburton Energy Services. The third grade of MgO is produced by calcining at temperatures ranging from 700° C.-1000° C. and is termed "light-burned" or "caustic" magnesia. Light-burned MgO is characterized by a high surface area, a low crystallinity and a high degree of reactivity when compared to the other grades of burned MgO. In embodiments, the MgO for use in a ULDCC comprises hard-burned MgO, light-burned MgO, dead-burned MgO or combinations thereof.

In an embodiment, a ULDCC comprises a chloride, alternatively an alkaline earth metal chloride, alternatively magnesium chloride ($MgCl_2$). In an embodiment, the ULDCC comprises magnesium chloride hexahydrate, $MgCl_2.6H_2O$. $MgCl_2.6H_2O$ is well known and available from a wide variety of sources. For example, a suitable $MgCl_2.6H_2O$ for use in this disclosure is C-TEK commercially available from Halliburton Energy Services.

In an alternative embodiment, a ULDCC comprises a phosphate salt such as for example and without limitation potassium phosphate, sodium phosphate, ammonium phosphate or combinations thereof.

In one embodiment, a ULDCC is formed through contacting MgO with $MgCl_2.6H_2O$ in the presence of other components to be described in more detail later herein. In such an embodiment, a ULDCC may comprise MgO and $MgCl_2.6H_2O$ present in a ratio of from about 2:1 MgO:$MgCl_2.6H_2O$, alternatively from about 1.5:1 MgO:$MgCl_2.6H_2O$, alternatively from about 1:1 MgO:$MgCl_2.6H_2O$, alternatively from about 1:0.5 MgO:$MgCl_2.6H_2O$.

In another embodiment, a ULDCC is formed through contacting the MgO with a phosphate salt in the presence of other components to be described in more detail later herein. In such an embodiment, a ULDCC may comprise MgO and a phosphate salt such as for example potassium phosphate, sodium phosphate, ammonium phosphate or combinations thereof. In such embodiments, the ratio of MgO:phosphate salt may be from about 1:4 alternatively from about 1:3, alternatively from about 1:2, alternatively from about 1:1.

Magnesium salt-based sealant systems typically referred to as Sorel cements, comprising magnesium oxide and a soluble salt, for example magnesium chloride, magnesium sulfate or ammonium mono or dibasic phosphate have been found to be suitable for various wellbore servicing applications such as for example conformance control where the cement compositions are used to control the influx of water into a subterranean formation. A discussion of various magnesia-based cements can be found in Lea's *Chemistry of Cement and Concrete* by Peter Hewlett: Fourth Edition, pages 813-820: 2003: Elsevier Publishing.

The ULDCC may include a sufficient amount of water to form a pumpable slurry. The water may be fresh water or salt water, e.g., an unsaturated aqueous salt solution or a saturated aqueous salt solution such as brine or seawater. The water may be present in the amount from about 10 to about 180 percent alternatively from about 20 to about 120 percent, alternatively from about 30 to about 70 percent by weight of total solids wherein the weight of total solids is the combined weight of MgO and chloride or phosphate salt.

In an embodiment, the ULDCC comprises a density reducing agent. Density reducing agents are known to one of ordinary skill in the art and include without limitation beads, foaming agents, expanding additives or combinations thereof. In an embodiment, the ULDCC comprises at least two density reducing agents such as a lightweight beads and foam.

In an embodiment, the ULDCC comprises lightweight beads. As used herein, a lightweight bead is defined as any particle added to the cement composition to lower its density, wherein the particle may be solid or hollow and may be a substantially hollow object that is spherical or substantially spherical in shape and filled with gas. Lightweight beads include for example and without limitation solid plastic beads, hollow pozzolanic spheres, hollow engineered glass bubbles, cenospheres, glass spheres, ceramic spheres, and combinations thereof. Cenospheres are hollow spheres primarily comprising silica ($SiO_2$) and alumina ($Al_2O_3$) and are filled with gas. Cenospheres are a naturally occurring by-product of the burning process of a coal-fired power plant. Their size may vary from about 10 to 350 μm. Examples of cenospheres, include EXTENDOSPHERES, commercially available from PQ Corporation of Valley Forge, Philadelphia, SPHERELITE, commercially available from Halliburton Energy Services Inc. and FILLITE commercially available from Trelleborg Fillite Inc. of Atlanta, Ga. An example of a hollow glass bead suitable for use in this disclosure is SCOTCHLITE commercially available from 3M Company. An example of a microsphere suitable for use in this disclosure is SPHERELITE commercially available from Halliburton Energy Services. In addition, an example of a solid bead suitable for use in this disclosure is FDP-C665 commercially available from Halliburton Energy Services.

The beads may be included in the ULDCC using any method known to one of ordinary skill in the art. For example, the beads may be dry blended with the cement before the addition of water, they may be mixed with the water to be added to the cement, or they may be mixed with the cement slurry consecutively with or after the addition of the water. In another embodiment, the beads may be pre-suspended in water and injected into the cement mix fluid or into the cement slurry as aqueous slurry.

In an embodiment, the ULDCC may comprise beads and MgO in a ratio of from about 1:1 beads:MgO, alternatively from about 0.5:1 beads:MgO.

In an embodiment, the density of the ULDCC is reduced by foaming to a desired density. Cement foaming is a technique well known to one skilled in the art. Foaming of liquefied cement slurries is achieved through the inclusion of a gaseous phase in the slurry. The gas may include any gas suitable for foaming the cement composition and for use in a wellbore. Without limitation, examples of suitable gases include nitrogen, air (e.g., compressed air), or combinations thereof. In some embodiments, the gas is nitrogen. The gas may be introduced to the ULDCC by any method suitable to foam the cement composition. In addition, the gas may be introduced at a constant rate or a ramped rate to yield a constant downhole foam concentration or density. In an embodiment, a foaming agent, such as for example a nonionic surfactant may be added to the slurry to help the foam withstand high salinity, hard water, solids, entrained oil, and high temperatures encountered in the well bore. Such foaming and/or foam stabilizing agents may be present in the ULDCC in an amount sufficient to provide a stable, foamed ULDCC. It is to be understood that one of ordinary skill in the art would be able to select the proper foaming and/or foam stabilizing agents according to the particular application.

In an embodiment, introducing the gas into the ULDCC to foam the composition may be accomplished by adding an expanding agent comprising foaming agents, foam stabilizing agents, expanding additives, or combinations thereof to the ULDCC. In an embodiment, the ULDCC may include an expanding additive. The expanding additive may be any component that enables a gas to become incorporated into the ULDCC. Without limitation, examples of suitable expanding additives in particulate form include aluminum powder, gypsum blends, deadburned magnesium oxide, and combinations thereof. Examples of expanding additives comprising aluminum powder that are commercially available include GAS-CHEK and SUPER CBL from Halliburton Energy Services, Inc. An example of an expanding additive comprising a blend containing gypsum is commercially available as MICROBOND from Halliburton Energy Services, Inc. In addition, examples of expanding additives comprising deadburned magnesium oxide are commercially available as MICROBOND M and MICROBOND HT from Halliburton Energy Services, Inc. Such expanding additives are described in U.S. Pat. Nos. 4,304,298; 4,340,427; 4,367,093; 4,450,010 and 4,565,578, which are incorporated herein by reference in their entirety. The ULDCC may contain an amount of the expanding additive from about 2 to about 18 wt. %, alternatively from about 5 to about 10 wt. %.

The addition of an expanding additive to the ULDCC may be accomplished by any suitable method. In one embodiment, the ULDCC is foamed by direct injection of an expanding additive into the cement composition. For instance, where the ULDCC is foamed by the direct injection of gas into the cement composition, the gas utilized may be air, an inert gas such as nitrogen, or combinations thereof. In other embodiments, the ULDCC is foamed by gas generated from a reaction between the cement composition and an expanding additive present in the cement composition in particulate form. For example, the ULDCC may be foamed by hydrogen gas generated in situ as the product of a reaction occurring in the composition.

A suitable foaming agent for use in this disclosure is the foamer/stabilizer ZONESEALANT 2000 available from Halliburton Energy Services. In an embodiment, a foaming agent is present in the ULDCC in a range of from about 0.1 to 5 by volume of water (bvow), alternatively about 1.5% bvow. In an embodiment, the ULDCC is foamed to a foam quality of from about 1 to about 50%, alternatively to a foam quality of less than or equal to about 30%.

In an embodiment, the ULDCC may comprise a retarder or inhibitor. Inhibitors may be used to adjust the time required for setting of the cementitious slurry. Such inhibitors may allow the operator to control the set time of the composition based on the geothermal temperature at which the composition will be used. Increasing the weight percentage of the inhibitor will increase the time required for the composition to undergo the phase transition from a slurry to a set mass with appreciable compressive strength. Inhibitors suitable for use in this disclosure include without limitation sodium hexametaphosphate (technical grade granular), potassium magnesium phosphate hexahydrate, potassium magnesium hexametaphosphate or combinations thereof. An example of an inhibitor suitable for use in this disclosure is sodium hexametaphosphate commercially available from Deepearth Solutions under the trademark R-TEK.

In an embodiment, the thickening time of the ULDCC may be adjusted through the use of an inhibitor (e.g., sodium hexametaphosphate) such that the composition remains pumpable during downhole placement before rapidly setting. The thickening time refers to the time required for the cement composition to achieve 70 Bearden units of Consistency (Bc). At about 70 Bc, the slurry undergoes a conversion from a pumpable fluid state to a non-pumpable paste. Inhibitors may be present in the ULDCC in a range of from about 0.01% to about 10.0% by weight of the magnesium oxide, alternatively from about 0.1% to about 8%, alternatively from about 0.1% to about 6%.

In an embodiment, the ULDCC may comprise a viscosifier and/or suspension aid. In an embodiment, the ULDCC comprises a suspension aid. The suspension aid may function to reduce or prevent the settling of cement particles and/or beads and allow such particles to remain suspended in the ULDCC. In an embodiment, the suspension aid comprises any material chemically compatible with the other components of the ULDCC and able to reduce or prevent the settling of the cement particles and/or beads and allow such particles to remain suspended in the ULDCC. In an embodiment the suspension aid may comprise organically surface modified inorganic solids, for example organophilic clay, organophilic glass or mineral fibers and the like.

In some embodiments, the suspension aid may be an elastomer. Without limitation, examples of suitable elastomers include polymerized dienes such as butadiene, isoprene and hexadiene; monoolefins such as ethylene, butene, and 1-hexene; or combinations thereof. In an embodiment, the elastomer includes polymers comprising aromatic hydrocarbon monomers and aliphatic dienes. Examples of suitable aromatic hydrocarbon monomers include without limitation styrene, alpha-methyl styrene and vinyltoluene. In an embodiment, the elastomer is a crosslinked or partially crosslinked material. Alternatively, the elastomer comprises a polyolefin grafted with polar monomers. Examples of polar monomers that may be grafted onto the polyolefin include without limitation maleic anhydride, acrylic acid, alkyl acrylic acid, vinylsulfonic acid, acrylamido-2-methyl-propane sulfonic acid, alkyl sulfonic acid, acrylonitrile, acrylate esters for example methylmethacrylate, styrene sulfonic acid and the like.

In an embodiment, the ULDCC comprises a viscosifying agent. The viscosifying agent may function to assist in suspension of the cementitious material in the suspension fluid by increasing the viscosity of the suspension fluid. In an embodiment, the viscosifying agent is any material chemically compatible with the other components of the ULDCC and able to increase the viscosity of the suspension fluid. Alternatively, the viscosifying agent is an organically modified inorganic solid, a dissolved organic polymer, an organophosphate/iron salt combination, a fatty acid salt and aluminum salt combination or combinations thereof. The organic polymer may be a hydrocarbon homopolymer, copolymer or terpolymer of random or block structures, linear or radial structures and may comprise aliphatic monomers, for example dienes such as butadiene, isoprene and hexadiene; monoolefins such as ethylene, butene, and 1-hexene; vinylaromatic monomers such as styrene, alpha-methylstyrene or combinations thereof. Examples of a suitable viscosifying agent includes without limitation KRATON G1702 oil viscosifier and, a block terpolymer of styrene, ethylene and propylene available from Kraton Polymers Inc.

In some embodiments, the same material may function as both the viscosifying agent and suspension aid. A viscosifier/suspension agent suitable for use in this disclosure includes without limitation the viscosifier/suspension agent BARAZAN® D PLUS available from Halliburton Energy Services.

In some embodiments, additives may be included in the ULDCC for improving or changing the properties thereof. Examples of such additives include but are not limited to salts, accelerants, fluid loss agents, weighting materials, dispersants, vitrified shale, formation conditioning agents, or combinations thereof. Other mechanical property modifying additives, for example, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art.

In an embodiment, the components of the ULDCC may be combined and foamed in any order as known to a person in ordinary skill in the art. Alternatively, the ULDCC may be prepared as disclosed herein. In an embodiment, the ULDCC is prepared by contacting the components previously disclosed herein with beads to create a cementitous slurry that may then be contacted with a foaming agent. In an alternative embodiment, the ULDCC may be prepared by contacting of the components previously disclosed herein with a foaming agent to create a foamed slurry which may then be contacted with beads. In such embodiments, the beads may be suspended in aqueous solution before being added to the foamed slurry. The components of the ULDCC may be combined using any mixing device compatible with the composition as known to one of ordinary skill in the art, for example a bulk mixer.

The ULDCC may be placed into a wellbore as a single stream and activated by downhole conditions to form a set cement composition. In such an embodiment, the ULDCC may be placed downhole through the drill bit forming a composition that substantially eliminates lost circulation. In yet another embodiment, the ULDCC is formed downhole by the mixing of a first stream comprising one or more ULDCC components such as for example MgO and/or a phosphate salt and a second stream comprising additional ULDCC components. Alternatively, the ULDCC may be formed downhole by the mixing of a first stream comprising MgO and a second stream comprising the chloride or phosphate salt, density reducing agent and optional additives. Methods for introducing compositions into a wellbore to seal subterranean zones are described in U.S. Pat. Nos. 5,913,364; 6,167,967; and 6,258,757, each of which is incorporated by reference herein in its entirety.

A ULDCC when prepared as disclosed herein may form a cemetitious composition having a density of from about 4 pounds per gallon (ppg) to about 12 ppg, alternatively from about 4 ppg to about 8 ppg, alternatively from about 4 ppg to about 6 ppg.

The ULDCC of this disclosure may develop an appreciable compressive strength when placed downhole. Herein the compressive strength is defined as the capacity of a material to withstand axially directed pushing forces. The maximum resistance of a material to an axial force is determined in accordance with API Recommended Practices 10B, Twenty-Second Edition, December 1997. Beyond the limit of the compressive strength, the material becomes irreversibly deformed and no longer provides structural support and/or zonal isolation. The compressive strength a cement formation attains is a function of both the cement maturity (or cure time) and the temperature at which setting occurs. The cement maturity specifically refers to the time the cement formulation is allowed to set.

In an embodiment, the ULDCC may develop a compressive strength of from about 100 psi to about 1,000 psi, alternatively from about 200 psi to about 900 psi, alternatively from about 300 psi to about 800 psi. The compressive strength of the ULDCC may develop in from about 15 minutes to about 24 hours, alternatively from about 30 minutes to about 10 hours, alternatively from about 1 hour to about 6 hours. As will be understood by one of ordinary skill in the art, the compressive strength that develops is directly proportional to the density of the cementitious composition. Consequently, increasing the slurry density will result in an increased final compressive strength of the set composition.

The ULDCCs of this disclosure exhibit a relatively constant viscosity for a period of time after they are initially prepared and while they are being placed in their intended locations in the wellbore, i.e., during the period when the slurry is in motion. Eventually, the cement compositions quickly set such that the viscosity increases from about 35 Bc to equal to or higher than 70 Bc in equal to or less than about 60 minutes, alternatively equal to or less than about 50 minutes, alternatively equal to or less than about 40 minutes, alternatively equal to or less than about 30 minutes, alternatively equal to or less than about 20 minutes, alternatively equal to or less than about 10 minutes, alternatively equal to or less than about 1 minute. This sudden jump in viscosity may be very desirable in preventing unwanted events such as gas or water migration into the slurry because it indicates the quick formation of impermeable mass from a gelled state after placement. This behavior is often referred to as "Right Angle Set" and such cement compositions are called "Right Angle Set Cement Compositions" in reference to the near right angle increase shown in a plot of viscosity as a function of time.

The ULDCC disclosed herein may be used as a wellbore servicing fluid. As used herein, a "servicing fluid" refers to a fluid used to drill, complete, work over, fracture, repair, or in any way prepare a wellbore for the recovery of materials residing in a subterranean formation penetrated by the wellbore. It is to be understood that "subterranean formation" encompasses both areas below exposed earth and areas below earth covered by water such as ocean or fresh water. Examples of servicing fluids include, but are not limited to cement slurries, drilling fluids or muds, spacer fluids, fracturing fluids or completion fluids, all of which are well known in the art. Without limitation, servicing the wellbore includes positioning the cement composition in the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof.

In an embodiment, the ULDCC may be introduced to the wellbore to prevent the loss of aqueous or non-aqueous drilling fluids into loss-circulation zones such as voids, vugular zones, and natural or induced fractures while drilling. The ULDCC may form a non-flowing, intact mass inside the loss-circulation zone which plugs the zone and inhibits loss of subsequently pumped drilling fluid, which allows for further drilling.

In an embodiment, the ULDCC may be employed in well completion operations such as primary and secondary cementing operations. The ULDCC may be placed into an annulus of the wellbore and allowed to set such that it isolates the subterranean formation from a different portion of the wellbore. The ULDCC thus forms a barrier that prevents fluids in that subterranean formation from migrating into other subterranean formations. Within the annulus, the ULDCC also serves to support a conduit, e.g., casing, in the wellbore. In an embodiment, the wellbore in which the composition is positioned belongs to a multilateral wellbore configuration. It is to be understood that a multilateral wellbore configuration includes at least two principal wellbores connected by one or more ancillary wellbores.

In secondary cementing, often referred to as squeeze cementing, the ULDCC may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth. Various procedures that may be followed to use a sealant composition in a wellbore are described in U.S. Pat. Nos. 5,346,012 and 5,588,488, which are incorporated by reference herein in their entirety.

In an embodiment, the ULDCC may serve as a gravel packing fluid in gravel-packing operations. Herein gravel packing refers to a method commonly utilized to prevent migration of sand into wells and to maintain the integrity of subterranean formations. In gravel packing, a permeable screen is placed against the face of a subterranean formation, followed by packing gravel against the exterior of the screen. The size of the gravel particles used for this purpose are larger than the sand particles but are also small enough to ensure that sand cannot pass through voids between the particles. The gravel is typically carried to the subterranean formation by suspending the gravel in a so-called gravel packing fluid and pumping the fluid to the formation. The screen blocks the passage of the gravel but not the fluid into the subterranean formation such that the screen prevents the gravel from being circulated out of the hole, which leaves it in place. The gravel is separated from the fluid as the fluid flows through the screen leaving it deposited on the exterior of the screen.

In an embodiment, the ULDCC may be used for water shutoff operations, in which the cement is used to seal the wellbore walls and prevent the unwanted loss of water from the subterranean formation. The right angle set property of the ULDCC decreases the likelihood of wellbore blowout during the time between the slurry and solid states of the cement.

In an embodiment, the ULDCC may be used for plug and abandonment of a well, i.e. to prepare a well to be shut in and permanently isolated. A series of plugs comprising the ULDCC may be set in the wellbore and tested at each stage for hydraulic isolation.

In an embodiment, the ULDCC of the present disclosure may be used to form temporary cement plugs. Temporary cement plugs may be used in a variety of applications, including hydraulic isolation, creation of a secure platform, and in window-milling operations for sidetracking a new wellbore. Such temporary plugs after having served their intended function may be removed by any method known to one skilled in the art for the removal of temporary cement plugs such as for example through acid solubilization. In an embodiment, the ULDCCs disclosed herein are acid soluble. The ULDCC once set may be dissolved upon contacting with an acidic material such as for example hydrochloric acid (HCl). In such embodiments, a set ULDCC may be contacted with a 50% HCl solution, alternatively a 15% HCl solution, alternatively a 5% HCl solution in amounts effective to solubilize the set ULDCC. Such effective amounts may be determined by one of ordinary skill in the art. As will be understood by one of ordinary skill in the art, other acidic materials may be used to dissolve a temporary cement plug formed using the ULDCC of this disclosure. Such acidic materials and their effective amounts are known to one of ordinary skill in the art.

The removal of a temporary cement plug comprising the ULDCC disclosed herein may be facilitated by the slightly higher permeability of these lightweight cements. Furthermore, the right angle set property of the ULDCCs may facilitate their use as temporary plugs, because the decreased time in the flowable state decreases the invasiveness of the slurry. Invasiveness here is meant to refer to the contamination of the subterranean formation. Decreased invasiveness means that more of the cement is in contact with the acid solvent during plug removal.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

A base cementitious slurry was prepared, as shown in Table 1. The slurry contained the indicated amounts of SCOTHCHLITE which are glass beads commercially available from 3M, THERMATEK® LT which is a hard burned MgO and, C-TEK which is $MgCl_2$, both of which are commercially available from Halliburton Energy Services and water. Additionally, ZONESEAL 2000L foamer stabilizer, which is a foaming agent commercially available from Halliburton Energy Services, was added to a level of 1.5% bvow (by volume of water). The slurry was foamed at 31% air quality.

TABLE 1

| Base Slurry Design | |
|---|---|
| THERMATEK ®-LT | 450 gm |
| C-TEK ® | 450 gm |
| 3M Beads | 200 gm |
| Sea Water | 307 gm |
| Base Slurry Density | 7.3 lb/gal |

A cement slurry, S1, having the ultra low density of 5.63 ppg (pounds per gallon) was obtained. Typical THERMATEK® slurries of similar composition but lacking glass beads may have a density of about 13.9-14.7 ppg.

Example 2

Compressive strength measurements were performed on standard 2-inch cubes formed from slurry S1 which was prepared as described in Example 1. Theses cubes were cured at 140° F. and atmospheric pressure for 72 hours. The compressive strength of each slurry was evaluated in accordance with API Recommended Practices 10B Twenty-Second Edition, December 1997. The compressive strength of each slurry is shown in Table 2.

TABLE 2

| ULDCC Compressive Strength | |
| --- | --- |
| Sample Number | Compressive Strength, psi |
| 1 | 837 |
| 2 | 809 |
| 3 | 826 |
| Average | 824 |

The results demonstrate that the ULDCC slurries of S1 having a density of 5.63 ppg form a cement with an average compressive strength of 824 psi.

Example 3

The stability of the slurries prepared as described in Example 1 was investigated. To test slurry/foam stability, a standard cylindrical sample (2" diameter and 4" length) formed from S1 was cured at 140° F. and atmospheric pressure for 72 hours. The density was measured as a function of height along the cylinder, and the results are shown in Table 3.

TABLE 3

| ULDCC Slurry/Foam Stability | |
| --- | --- |
| Sample Location | Density, ppg |
| Top | 5.621 |
| Middle | 5.634 |
| Bottom | 5.632 |
| Average Density, ppg | 5.629 |

The results demonstrate that the set cement composition was stable as evinced by the stable density as a function of height along the test cylinder.

Example 4

The thickening time and consistency of a slurry comprising 300 grams light-burned MgO, 300 grams C-TEK and 200 grams water were determined. The thickening time plot in FIG. 1 demonstrates the perfect "Right Angle Set" behavior of the compositions even at 60° F. Without wishing to be limited by theory, it is anticipated that the addition of a density reducing agent would not affect the right angle set and short transition times exhibited by these types of slurries.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A slurry composition comprising:
an alkaline metal oxide, a chloride or phosphate salt, water, glass beads and a foaming agent.

2. The composition of claim 1 wherein the alkaline metal oxide comprises magnesium oxide.

3. The composition of claim 2 wherein the magnesium oxide comprises light burned magnesium oxide, hard-burned magnesium oxide, dead-burned magnesium oxide or combinations thereof.

4. The composition of claim 1 wherein the chloride or phosphate salt comprises magnesium chloride, potassium phosphate, sodium phosphate, ammonium phosphate or combinations thereof.

5. The composition of claim 1 wherein the chloride salt is magnesium chloride and wherein the ratio of magnesium oxide to magnesium chloride is about 2:1.

6. The composition of claim 2 wherein the ratio of magnesium oxide to phosphate salt is about 1:4.

7. The composition of claim 1 further comprising a retarder.

8. The composition of claim 1 further comprising a viscosifier, a suspension aid or combinations thereof.

9. The composition of claim 1 wherein the slurry is foamed to a foam quality from about 1% to about 50%.

10. The composition of claim 1 having a density of from about 4 to about 12 pounds per gallon.

11. The composition of claim 1 having a compressive strength of from about 100 psi to about 1,000 psi.

12. The composition of claim 1 displaying a right angle set.

13. The composition of claim 1 having about 100% acid solubility.

14. A foamed slurry comprising:
magnesium oxide,
water,
a chloride or phosphate salt, and
glass beads,
wherein the slurry has a density of from about 4 to about 12 pounds per gallon.

15. The slurry of claim 14 wherein the slurry is foamed to foam quality of from about 1% to about 50%.

16. The slurry of claim 14 wherein the chloride salt comprises magnesium chloride.

17. The slurry of claim 16 wherein the ratio of magnesium oxide to magnesium chloride is about 2:1.

18. The slurry of claim 14 wherein the phosphate salt comprises potassium phosphate, sodium phosphate, ammonium phosphate or combinations thereof.

19. The slurry of claim 14 wherein the ratio of magnesium oxide to phosphate salt is about 1:4.

20. The slurry of claim 14 wherein the slurry sets to yield a cement with a compressive strength of from about 100 psi to about 1,000 psi.

21. A foamed slurry comprising:
magnesium oxide,
water,
a chloride or phosphate salt, and
glass beads,
wherein the slurry has a density of from about 4 to about 12 pounds per gallon and the set slurry is acid soluble.

* * * * *